United States Patent Office

2,900,265
Patented Aug. 18, 1959

2,900,265

HYDRAULIC CEMENTITIOUS MIXTURES

Alexander Klein, near Danville, Calif.

No Drawing. Application May 20, 1957
Serial No. 660,059

7 Claims. (Cl. 106—91)

This invention relates to concrete, mortar, grout, and the like, herein generically called "hydraulic cementitious mixtures," containing an admixture for modifying the properties thereof.

Hydraulic cementitious mixtures may, for the present purpose, be defined as mixtures containing essentially a hydraulic cement as the cementing ingredient, aggregate and water, having the property of setting to form a hardened mass, hydraulic cement being cement that can harden under water. Such mixtures contain any hydraulic cement, such as Portland cement and such materials in finely divided form as natural cement, water-quenched blast furnace slag, and possolanic materials, e.g., volcanic ash, fly ash, kieselguhr or diatomaceous earth, etc.; they may contain mineral or non-mineral aggregates or mixtures thereof. Of particular interest among various mixtures with which the invention is concerned are concretes and grouts. In the former, cement, water and aggregate, including coarse materials, are mixed together prior to being molded or otherwise emplaced; grouts, on the other hand, are mixtures consisting mainly of cement, water, and sand of small size, which can usually be pumped through pipe lines and normally have such fluidity that they can be readily forced into small spaces, such as voids and cracks or a porous or honeycombed concrete mass or into the interstices of preplaced aggregate.

The term "admixture" denotes a substance, other than aggregate, water or the cement used as the binding material, that is used as an ingredient for the cementitious mixture for modifying the properties thereof in such a way as to make it more suitable for the work in hand.

Increased plasticity, high early strength and high ultimate strength of cementitious mixtures are of major importance. The first improves workability and fluidity, and inexpensive admixtures which increase plasticity without either incurring the expense of using an unduly high proportion of cement or of making a sacrifice to strength by using an excessive amount of water have long been sought. For methods used in determining the consistency and workability of cementitious mixtures, see U.S. Patent No. 2,588,248.

Drawbacks of many commercially available admixtures of the type considered above are that their effectiveness in improving strength is limited and often decreases as the hardened mass ages; further, they and other known admixtures are expensive. Also, many known admixtures, while effective with certain Portland cements, produce only small or insignificant improvements with Portland cements of other types and origins.

It is an object of this invention to increase the strength of hydraulic cementitious mixtures by including therein an inexpensive and readily available admixture which is effective to increase not only the early strength but also the later strength of the hardened mass. A further object is to increase the strength by including in the cementitious mixture an admixture which is effective with a wide variety of hydraulic cements having different origins. Still another object is to increase the strength by including an admixture which can be used together with another admixture for a special purpose.

Now according to this invention, it was found that the strength characteristics of hydraulic cementitious mixtures can be improved by incorporating therein a small amount, usually between about 0.02 and about 0.8 percent by weight, reckoned on a dry basis and based on the cement content of the mixture (including pozzolan when this replaces a part of the Portland cement) of the reaction product resulting when concentrated Steffen filtrate (CSF) is subjected to a hydrolysis treatment without removing therefrom glutamic acid or its precursors. This reaction product is herein, for brevity, called hydrolyzed CSF.

The hydrolyzed CSF may include all of the constituents naturally occurring in CSF or may be subjected to treatments for the removal of some constituents, such as suspended solids and other organic or inorganic constituents which are readily or customarily removed in the hydrolysis of CSF. For example, in the manufacture of glutamic acid from CSF, suspended solids are removed by filtration prior to hydrolyzation with caustic; thereafter the liquor is partially acidified, concentrated, and crystallyzed substances are filtered off prior to the final separation of glutamic acid; I may use the filtrate from the last-mentioned filtration (if desired, after adjusting the pH) as my admixture.

Concentrated Steffen filtrate is known in the beet sugar industry, where it is the practically sugar-free filtrate obtained from molasses, the latter being a sugar syrup from which sugar has been recovered to the extent that further crystallization of sugar from it is impractical. In the Steffen process such molasses are treated with the oxide or hydroxide of a heavier element of group II–A of the periodic system of the elements, particularly calcium or barium, to form insoluble addition products of sucrose and some other sugars; the insoluble addition products are separated by filtration, and the practically sugar-free liquor is known as Steffen filtrate. This filtrate is carbonated soon after production to precipitate calcium and/or other heavier elements noted above as the corresponding carbonate, which is removed by thickening and filtration. The filtrate is then concentrated to about 65% solids in a series of evaporators, to produce concentrated Steffen filtrate, having a pH between about 9 and 12 according to the sugar refining process used, the quality of the beet crop, and other local factors; a pH of about 10 is common. This filtrate contains alpha pyrrolidone carboxylic acid, a precursor of glutamic acid.

The resulting CSF may be subjected to hydrolysis either directly or after clarification or further treatment for removing such constituents as suspended solids, e.g., by filtration. Hydrolysis can be effected either by acid or alkali as the hydrolyzing agent; both are effective because alpha pyrrolidone carboxylic acid, the precursor of glutamic acid, is its anhydride. One molecule of water is added by the hydrolysis reaction:

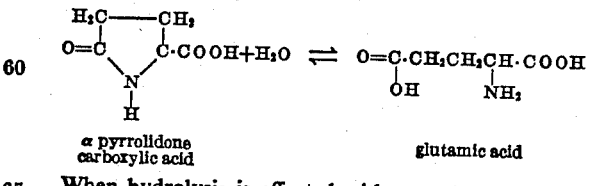

α pyrrolidone carboxylic acid       glutamic acid

When hydrolysis is effected with an acid, any of various mineral acids, particularly sulfuric and hydrochloric acids, may be used. With such a treatment the pH will be reduced. When hydrolysis is effected with an alkali the pH may be increased. The various techniques for effecting hydrolysis are known per se and need not be described herein; see "Beet Sugar Technology" by R. A. McGinnis, 1951, pages 479–481.

It is preferred to use the admixture in the cementitious mixtures in a form which is substantially neutral or moderately acid, i.e., with a pH between about 3.2 and 8, usually about 5, e.g., 4.8 as in the example. A mineral acid, such as sulfuric or hydrochloric acid or an inorganic or organic base, such as a hydroxide of sodium, potassium or calcium, ammonia, or triethanol amine, may be added as required to adjust the pH. Control of pH facilitates packaging, shipping and handling; it also renders the admixtures effective when used in conjunction with other admixtures which may be incompatible with or ineffective in a highly acidic or basic medium and which may be included in the cementitious mixture to impart a desirable characteristic thereto. The invention is not, however, limited to this control of pH.

The admixture according to the invention may be added to the hydraulic cementitious mixture either alone as the only admixture, or in conjunction with other admixtures which may be incorporated separately or together with the hydrolyzed CSF after being mixed therewith. As an example, it is possible to use as an additional admixture an air-entraining agent, such as a foaming resin, a sulphonated hydrocarbon, alkyl aryl sulphonates, or the like, or an accelerator, such as calcium chloride, or a retarder, such as calcium sulphate; these admixtures, being known per se, are not further described herein. When such an additional admixture is unstable or ineffective at an extreme pH it is advisable to adjust the pH in the manner described above, both in the case in which the additional admixture is incorporated separately and when it is first combined with the hydrolyzed CSF.

The admixture according to the invention can be incorporated in the hydraulic cementitious mixture in any suitable manner, e.g., separately during the mixing or together with one or more of the main ingredients of the mixture, care being taken to insure proper mixing. The admixture may be added to the dry cement or to a small part thereof with which it may be intimately mixed to obtain a better distribution throughout the final mixture. It may also be added to sand which, when subsequently mixed with cement and water, produces grout or mortar or, with the addition of coarser aggregate, produces concrete. In most cases, however, it is convenient to add the admixture with the mixing water, e.g., first forming a solution in a minor portion of the water and thereafter combining the solution with the remainder of the water.

The admixture according to this invention is not merely a plasticizer but does possess plasticizing properties, as will be apparent from the experimental data appended hereto.

The hydrolyzed CSF admixture should be distinguished from prior admixtures that contain or consist largely of sugar or sugar-containing substances, such as molasses and sucrose. Such prior admixtures were added only as plasticizers; however, they generally have the inherent property of retarding the setting of hydraulic cement and therefore reduce the early strength. To counteract such retardation it was generally the practice to include an accelerator, such as calcium chloride, with such prior sugar-containing admixtures. While such accelerators may be used also with the hydrolyzed CSF admixture of the instant invention, they are not usually included because the hydrolyzed CSF improves early strength as well as the later strength.

Hydrolyzed CSF has an important cost advantage over end liquor, which is described as an admixture in my U.S. Patent No. 2,793,129, granted May 21, 1957, for the same purpose as the present admixture. Thus, it was found that similar effects on the cementitious mixtures are produced by like amounts of (a) the admixture according to this invention and (b) a mixture of end liquor and CSF in the proportion to have the same pH. However, since in case (a) the pH is lowered by the use of technical acid instead of the more expensive end liquor significant cost savings are realized.

Moreover, CSF, which is used in the hydrolysis reaction, is available as an industrial by-product more widely and in greater quantities than end liquor.

The efficacy of the hydrolyzed CSF is demonstrated by the following experimental data:

A plurality of fresh concrete batches were prepared from the same Portland cement and graded mineral aggregate from 0 to ¾-inch size in the ratio of 1:6.7, the aggregate having a fineness modulus of 5.1. The batches contained the admixtures indicated by capital letters in the following table, which denote the following: A, the total reaction product produced by subjecting CSF to a hydrolysis treatment with HCl and having a pH of 4.8; B, an admixture in accordance with my above-identified earlier patent, which consisted of the end liquor resulting from the separation of glutamic acid from CSF and the amount of untreated CSF required to adjust the pH to 4.8; C, a commercial admixture containing $CaCl_2$ to accelerate hardening and promote early strength. The first batch listed in the table was a control batch and contained no admixture.

The quantities of the admixtures were 0.735 percent by weight (dry basis) of the cement in the case of admixtures A and B and 0.266 percent by weight in the case of admixture C, to achieve approximately the same plasticity with the same water-to-cement ratio. The same plasticity was attained in the control batch by a higher water-to-cement ratio. Thus, in each batch the ingredients were mixed to produce fresh concretes of the same workability as determined by the slump test, viz., a slump of 4 inches. These concretes were molded in 3- by 6-in. cylinders and cured at standard conditions in a foggy atmosphere. Strengths were determined after 1, 3 and 7 days as shown in the table; each tabulated value is the average of several samples:

| Batch | Admixture | Water to cement ratio | Compression strengths | | | | | |
|---|---|---|---|---|---|---|---|---|
| | | | 1 day | | 3 days | | 7 days | |
| | | | p.s.i. | Percent | p.s.i. | Percent | p.s.i. | Percent |
| 1 | None | 0.657 | 350 | 100 | 850 | 100 | 1,390 | 100 |
| 2 | A | 0.571 | 560 | 160 | 1,560 | 184 | 2,470 | 178 |
| 3 | B | 0.571 | 520 | 148 | 1,550 | 183 | 2,460 | 177 |
| 4 | C | 0.571 | 750 | 214 | 1,510 | 178 | 2,270 | 163 |

It will be noted that compression strengths are reported both in pounds per square inch and as the percentages of the strengths of the control batches. The data show that the admixture A, in accordance with this invention, was highly effective. Although it accelerates the early strength (1-day) its effectiveness continues at later strengths (7-days) as is evident from a comparison with the batch containing admixture C.

It is evident that the cementiticus mixtures to which the invention can be applied are not limited to those employed in concrete, brick or stone structures, but may include any such mixture containing a hydraulic cement, e.g., stucco and plaster.

I claim as my invention:

1. A cementitious mixture consisting essentially of hydraulic cement as the cementing ingredient and a small amount of the reaction product resulting from the hydrolysis of concentrated Steffen filtrate and containing glutamic acid, said amount, reckoned on a dry basis, being between about 0.02 and 0.8 percent by weight of the cement content of said mixture.

2. A cementitious mixture according to claim 1 wherein said reaction product has a pH of between 3.2 and 8.0.

3. A cementitious mixture according to claim 2 wherein said pH is about 5.

4. A cementitious mixture according to claim 1 wherein said reaction product is obtained by hydrolyzing concentrated Steffen filtrate with a mineral acid.

5. A cementitious mixture according to claim 1 wherein said reaction product is obtained by hydrolyzing concentrated Steffen filtrate with an alkali.

6. A cementitious mixture consisting essentially of hydraulic cement as the cementing ingredient, an air-entraining agent, and a small amount of the reaction product resulting from the hydrolysis of concentrated Steffen filtrate and containing glutamic acid, said amount, reckoned on a dry basis, being between about 0.02 and 0.8 percent by weight of the cement content of said mixture.

7. A cementitious mixture consisting essentially of a hydraulic cement as the cementing ingredient, pozzolan, and a small amount of the reaction product resulting from the hydrolysis of concentrated Steffen filtrate and containing glutamic acid, said amount, reckoned on a dry basis, being between about 0.02 and 0.8 percent by weight of the combined cement and pozzolan content of said mixture.

References Cited in the file of this patent

UNITED STATES PATENTS 2,793,129     Klein _____ May 21, 1957

FOREIGN PATENTS 413,322     Great Britain _____ July 13, 1934